Figure 1:
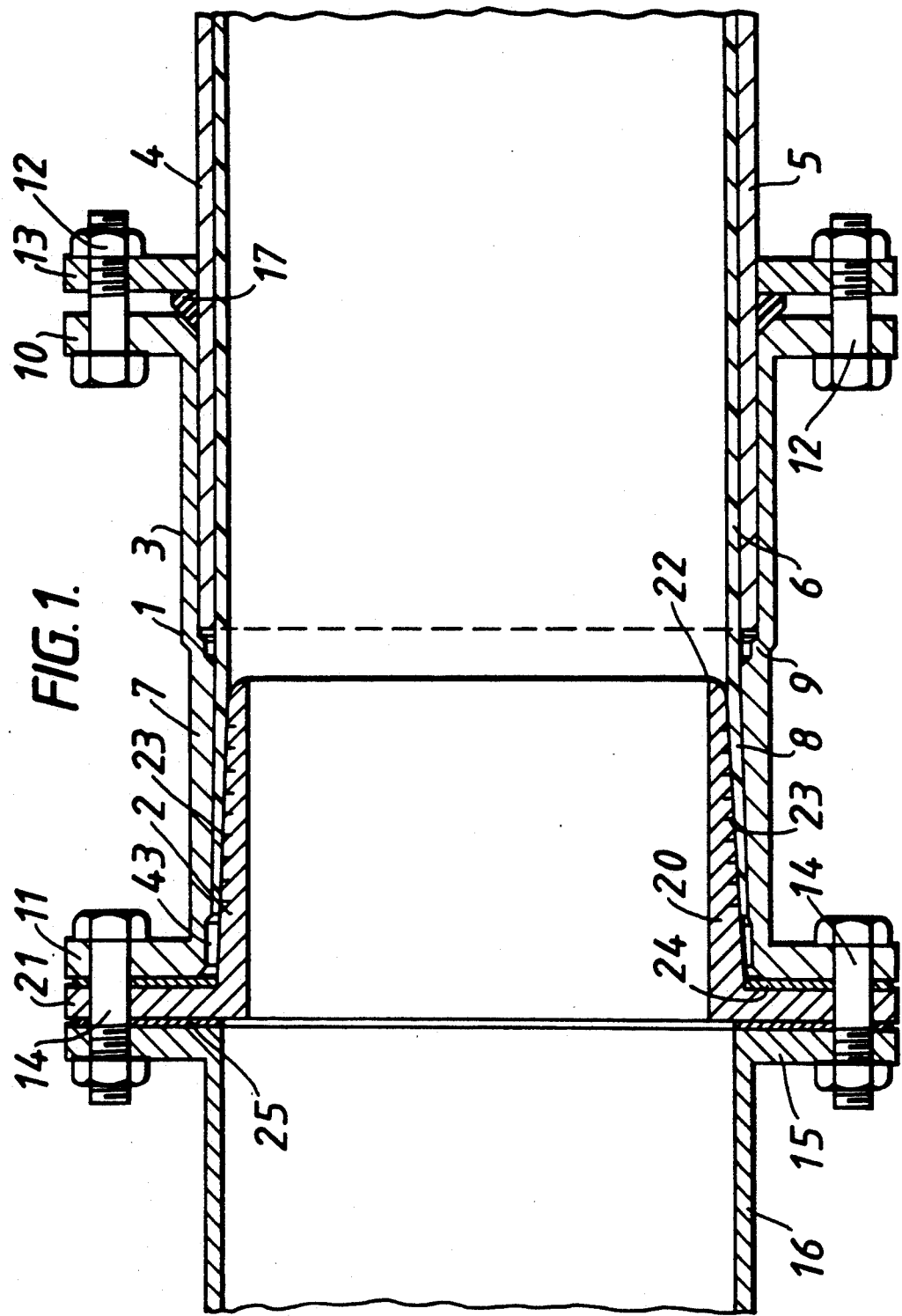

United States Patent [19]
Harvey

[11] Patent Number: 5,244,237
[45] Date of Patent: Sep. 14, 1993

[54] FITTING WITH A COMPRESSIBLE LINING

[75] Inventor: Anthony A. Harvey, Essex, United Kingdom

[73] Assignee: British Gas plc, England

[21] Appl. No.: 787,930

[22] Filed: Nov. 8, 1991

[30] Foreign Application Priority Data

Nov. 8, 1990 [GB] United Kingdom ............... 9024290

[51] Int. Cl.⁵ .......................... F16L 9/14; F16L 39/00
[52] U.S. Cl. ...................................... 285/55; 285/291; 285/242
[58] Field of Search .................. 285/291, 55, 149, 242

[56] References Cited

U.S. PATENT DOCUMENTS 3,210,095 10/1965 Elliott ................................ 285/291
4,064,619 12/1977 Echols et al. ...................... 285/55
4,083,583 4/1978 Volgstadt et al. ................. 285/55
4,494,776 1/1985 Press .................................. 285/55
4,709,946 12/1987 Hunter .............................. 285/55
4,786,757 11/1988 Owensby et al. ................ 285/149
4,805,942 2/1989 Goodridge ....................... 285/149

Primary Examiner—Eric K. Nicholson
Attorney, Agent, or Firm—Larson and Taylor

[57] ABSTRACT

A fitting for connection to the end of a pipe lined internally with a compressible lining with which the fitting is to form a seal a portion of which lining extends beyond the end of the pipe, comprises a collar 1 having an internal wall adapted to fit over the end of the pipe 4 and to sleeve the portion 8 of the lining 6 and means 2 adapted to clamp a circumferential portion of the lining 6 to the adjacent internal wall of the collar 1.

16 Claims, 6 Drawing Sheets

FITTING WITH A COMPRESSIBLE LINING

The present invention relates to a fitting for connection to the end of a pipe lined internally with a compressible lining with which the fitting is to form a seal.

It is well known to extend the life of fluid carrying pipes made of pit, cast, spun or ductile iron and steel by lining them with a resin impregnated fabric hose or with polyethylene or similar type plastics material when the pipes become defunct due to corrosion or fracture or because the joints are leaky.

In the case of hoselined pipes it is common practice to replace an end section of the defunct pipe with a new non-defective section of similar diameter to the old pipe before the pipe is lined. This new section of pipe is connected to the remainder of the old pipe and after the pipe has been lined with the hose, means are provided to form a seal between a portion of the lining protruding from the new end of the defunct pipe and the internal wall of the new section of pipe into which section the lining extends.

One problem with a seal of this type is that it is not possible conveniently to test the leak tightness of the seal independently of the remainder of the pipe.

It is therefore an object of the present invention to seek to overcome this disadvantage.

According to one aspect of the present invention we provide a fitting for connection to the end of a pipe lined internally with a compressible lining with which the fitting is to form a seal, the fitting comprising a collar having an internal wall adapted to fit over the end of the pipe and to sleeve part of the lining protruding from the end of the pipe, means for connecting the collar to the pipe and means for clamping a circumferential portion of the lining to the adjacent internal wall of the collar.

According to another aspect of the present invention we provide a fitting for connection to the end of a pipe lined internally with a compressible lining with which the fitting is to form a seal, the fitting comprising a member having a generally cylindrical part having an external wall adapted to fit within a part of the lining protruding from the end of the pipe, means for clamping a circumferential portion of the lining to the external wall of the member and means for connecting the member to the pipe.

Figure 2:
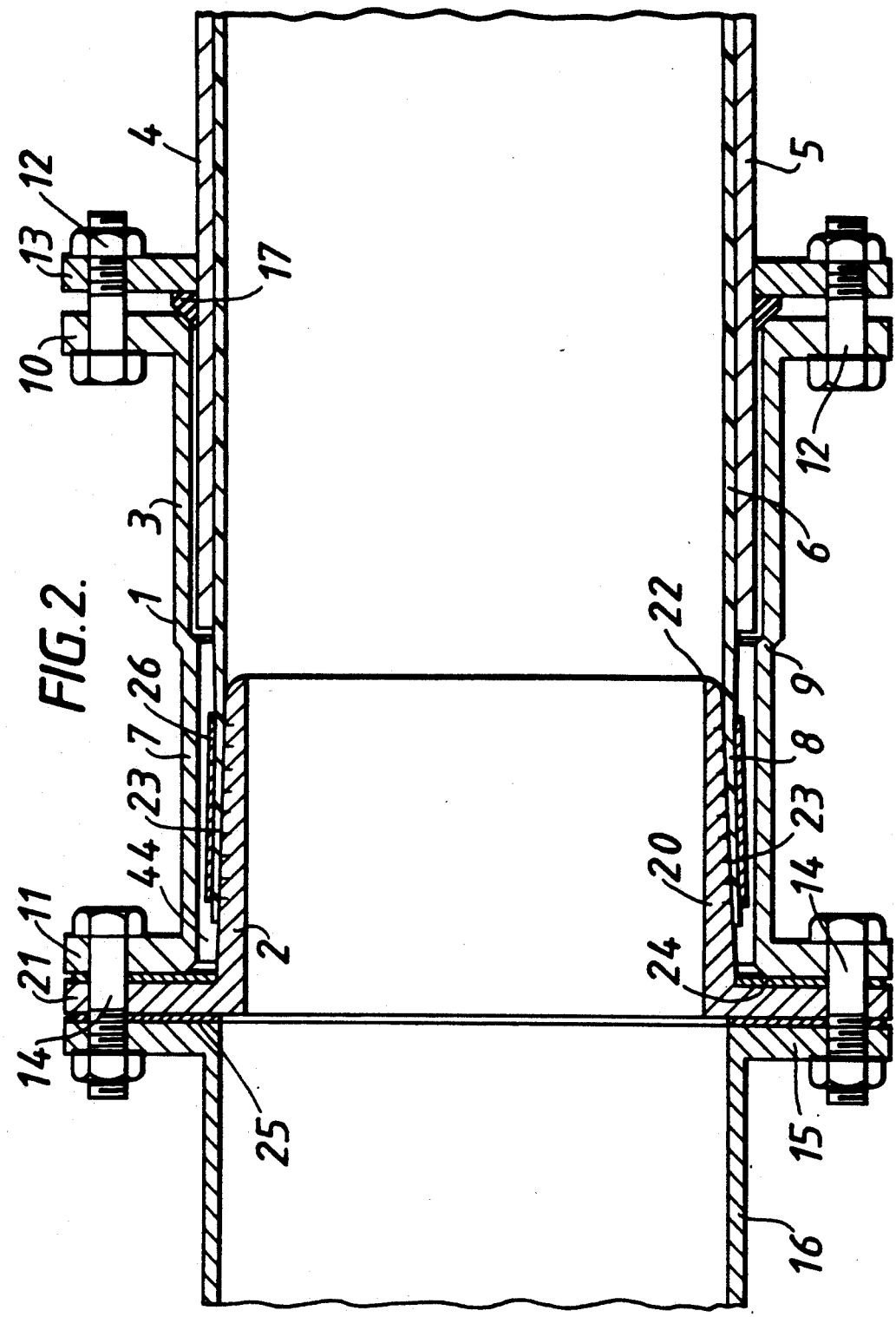
Figure 3:
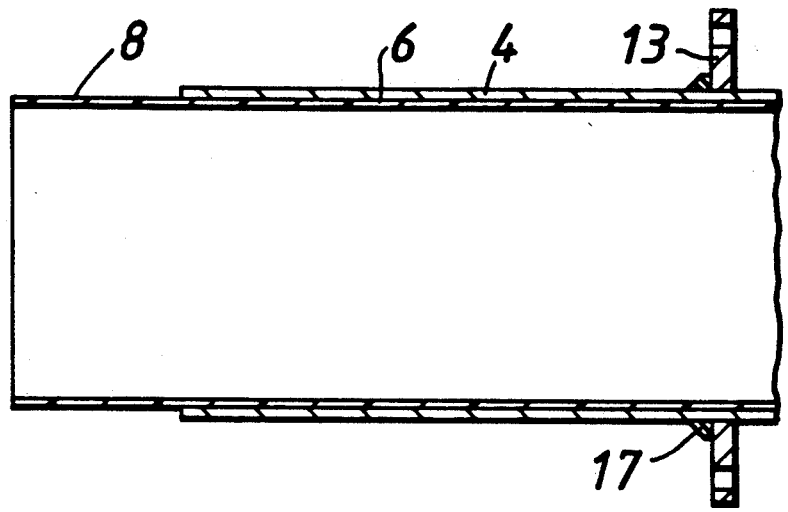
Figure 4:
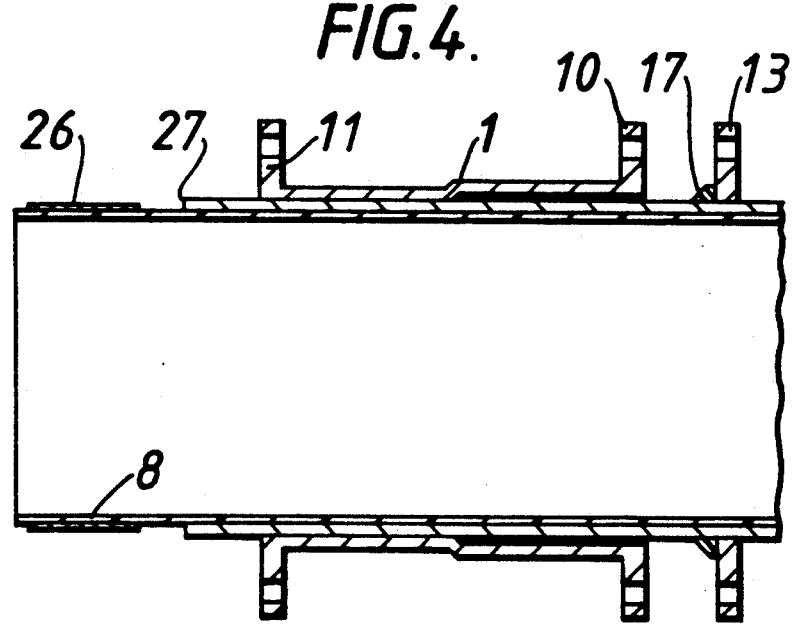
Figure 7:
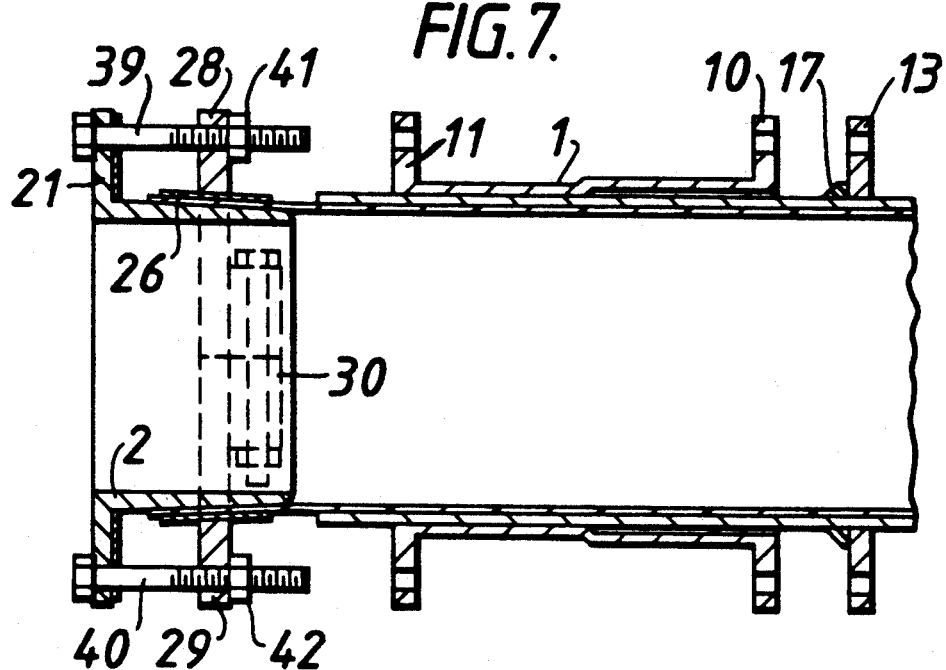
Figure 8:
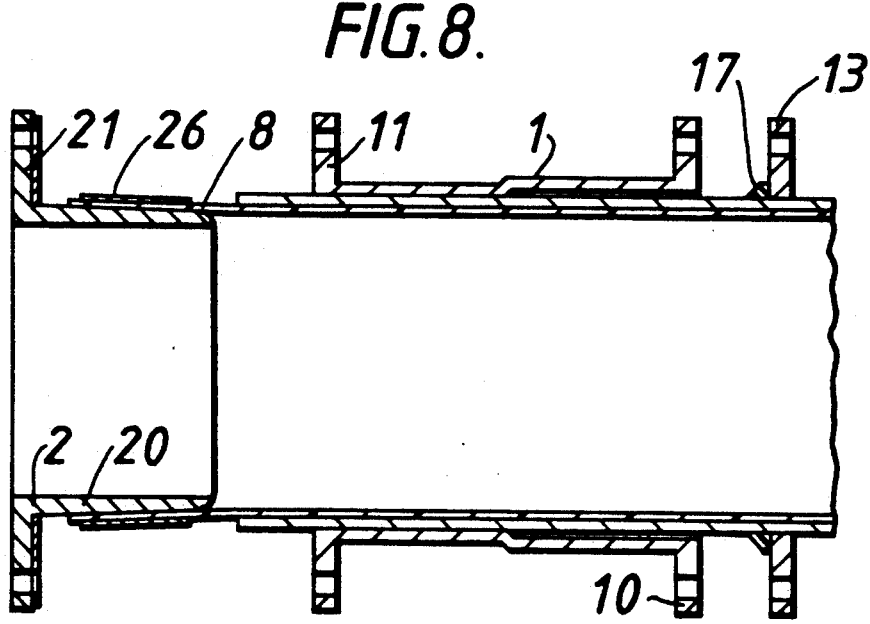
Figure 9:
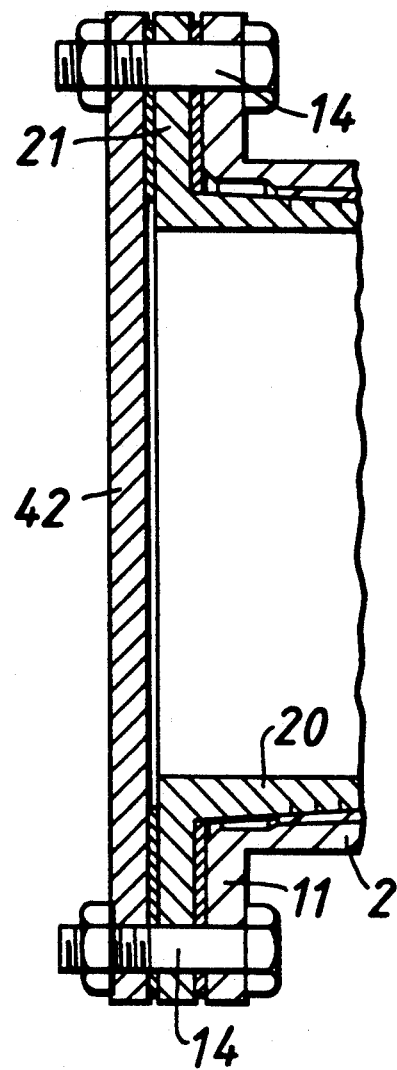

Embodiments of the invention will now be particularly described with reference to the drawings in which:

FIG. 1 is a longitudinal view in section of one embodiment of the fitting shown connecting the two adjoining ends of pipes or pipe sections together, FIG. 2 is a longitudinal view in section of another embodiment of the fitting also shown connecting the two adjoining ends of pipes or pipe sections together, FIGS. 3 to 8 show the stages in the assembly of the fitting shown in FIG. 2 and FIG. 9 shows the fitting of FIG. 1 used to blank off the end of a pipe.

Referring to FIG. 1 the fitting comprises a collar 1 and a clamping means in the form of a member 2 for use with the collar 1.

The collar 1 is generally cylindrical in shape and has a first part 3 having an internal wall diameter dimensioned to form a close sliding fit with the external wall 4 of the end of a pipe or pipe section 5 which is lined with a compressible lining 6, the collar 1 having a second part 7 with an internal wall diameter dimensioned to sleeve part 8 of the lining 6 protruding outwardly from the end of the pipe 5. As shown the internal diameter of the first part 3 of the collar 1 is larger than that of the second part 7 for obvious reasons and a junction in the form of a step 9 is formed where the walls adjoin.

Each end of the collar 1 is formed with circular flanges 10 and 11 respectively, the flange 10 permitting one end of the collar 1 to be bolted by nut and bolt assembles 12 to a sliding flange 13 attached by a compression fitting to the outer wall 4 of the pipe 5 and flange 11 permitting the other end of the collar 1 to be bolted by nut and bolt assemblies 14 to inter alia the flanged end 15 of an adjacent pipe or pipe section 16.

A flexible circular gasket 17 of rubber o like material is in use as shown positioned around the outer wall 4 of the pipe or pipe section 5, the gasket 17 being compressed between the flanges 10 and 13 to form a seal between the collar 1 and the external wall 4 of the pipe or pipe section 5 upon sufficient tightening of the nut and bolt assemblies 12.

In the case of the second part 7 of the collar 1 shown in FIG. 1 the internal wall diameter tapers inwardly from its flanged end 11 to the step 9 forming the junction for purpose to be described. However, in the fitting shown in FIG. 2 where parts identical to those shown in FIG. 1 bear identical reference numbers, the internal wall diameter of the second collar part 7 remains constant.

Referring again to FIG. 1, the member 2 has a generally cylindrical body 20 which is formed with a flange 21 at one end, the external diameter of the body 20 tapering inwardly from the flange 21 to its other end 22. In both FIGS. 1 and 2, the generally cylindrical body 20 extends for a substantial axial distance into the interior of the collar 1, and in particular, into the second part 7 thereof, so as to form an annular interface therewith, with the lining 6 therebetween.

The external wall of the member 2 is provided with circumferential indentations 23 extending inwardly from the outer surface of the wall. The indentations 23 are arranged as spaced rings along the wall for a purpose to be described.

In use of the fitting, the first collar part 3 is fitted over the outer wall 4 of the pipe or pipe section 5 until the wall engages the step 9.

The cylindrical body 20 of the member 2 is then inserted into the lining part 8, a compressible flat annular gasket 24 of rubber or like material being first positioned around the outer wall of the body 20 so as in use to be compressed between the flanges 11 and 21. Finally the flanges 11 and 21 are bolted to the pipe flange 15 by means of the nut and bolt assemblies 14, a gasket 25 similar to gasket 24 being positioned between the flanges 15 and 21.

The tapers on the outer wall of the body 20 and on the inner wall of the collar part 7 are matched so that on tightening the assemblies 14 the lining portion 8 is compressed between the body 20 and the part 7 s that a seal is formed between the lining and the collar. Correspondingly seals are also formed between the flanges 11 and 21 and 21 and 15 by compression of the gaskets 24 and 25.

The indentations 23 in the surface of the body 20 enable the body 20 to grip the lining portion 8 when the latter is forced by the body 20 against the collar part 7 to form the seal.

In another use of the fitting, the collar 1 can be connected to the pipe 4 before it is lined. The pipe 5 is then lined, part 8 of the lining being allowed to protrude beyond the end of the pipe 5 into the second collar part 7.

The cylindrical body 20 of the member 2 is inserted into the lining 8 and the member 2 is connected to the pipe 4 so that the lining part 8 is compressed between the body 20 and the collar part 7.

Referring to FIG. 2 where parts identical in nature to those in FIG. 1 bear identical reference numerals, the collar part 7 in this case mainly serves as a means for connecting the member 2 to the pipe wall 4 but unlike that shown in FIG. 1 the collar part 7 in FIG. 2 has no taper on its internal wall. In addition a clamping means in the form of a ring-like member 26 is provided to clamp the lining portion 8 to the outer portion of the member body 20.

The member 26 is of spring steel or like resilient material and has a frusto-conical form and in use as will subsequently be described is fitted over the lining portion 8 with its narrower diameter end leading.

Referring now to FIGS. 3 to 8, the assembly of the fitting on the pipe wall 4 proceeds as follows. Firstly (FIG. 3) the sliding flange 13 is located over the end of the pipe wall 4 and is slid along the wall 4 away from the protruding lining 8 to the position shown. Then the gasket 17 is also located over the pipe wall 4 and pushed towards and against the flange 13. It will be appreciated that a similar operation is necessary in the assembly of the fitting shown in FIG. 1.

Next (FIG. 4) the collar 1 shown in FIG. 2 is located around that section of the pipe wall 4 lying between the flange 13 and the end 27 of the pipe 5.

Figure 5:
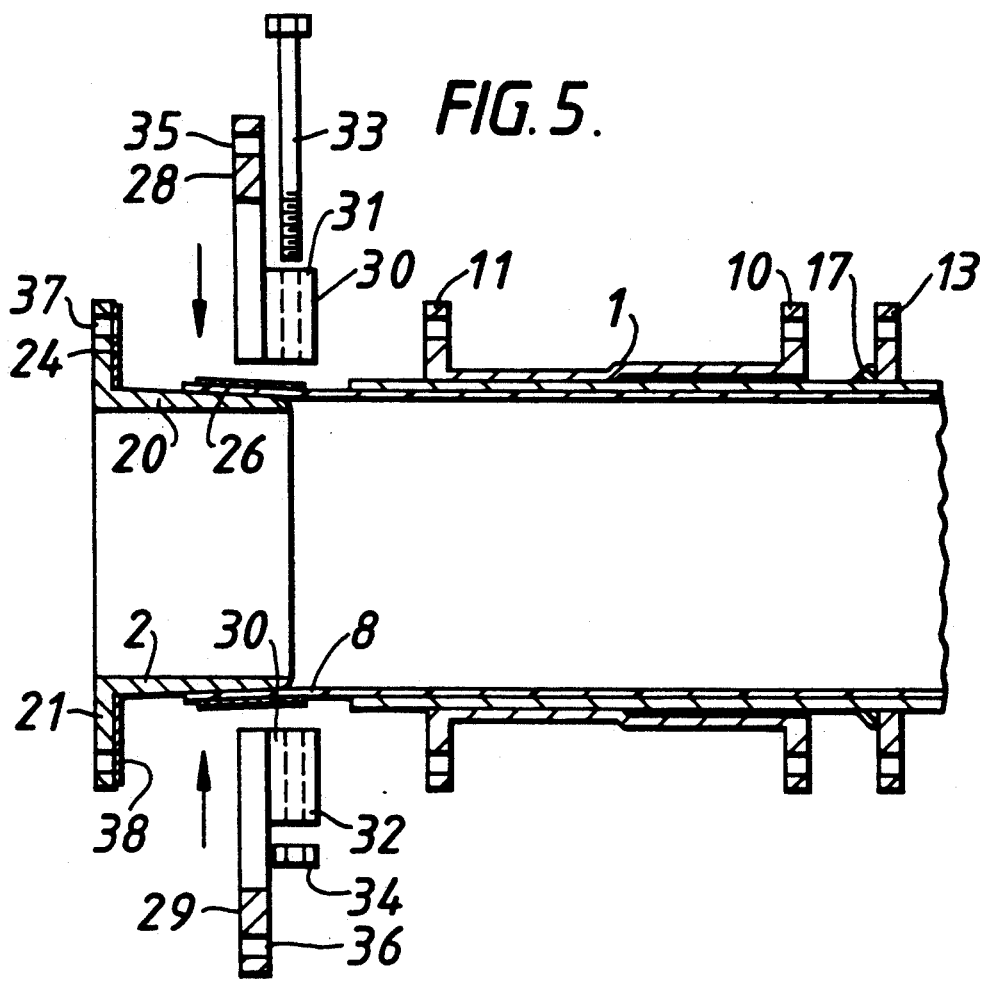

This is followed as shown in FIG. 5 by the clamping ring 26 being fitted over the lining portion 8 and the body 20 of the member 2 being inserted into the lining portion 8, the gasket 24 being first positioned around the outer wall of the body 20 so as in use to be compressed between the flanges 11 and 21.

Figure 6:
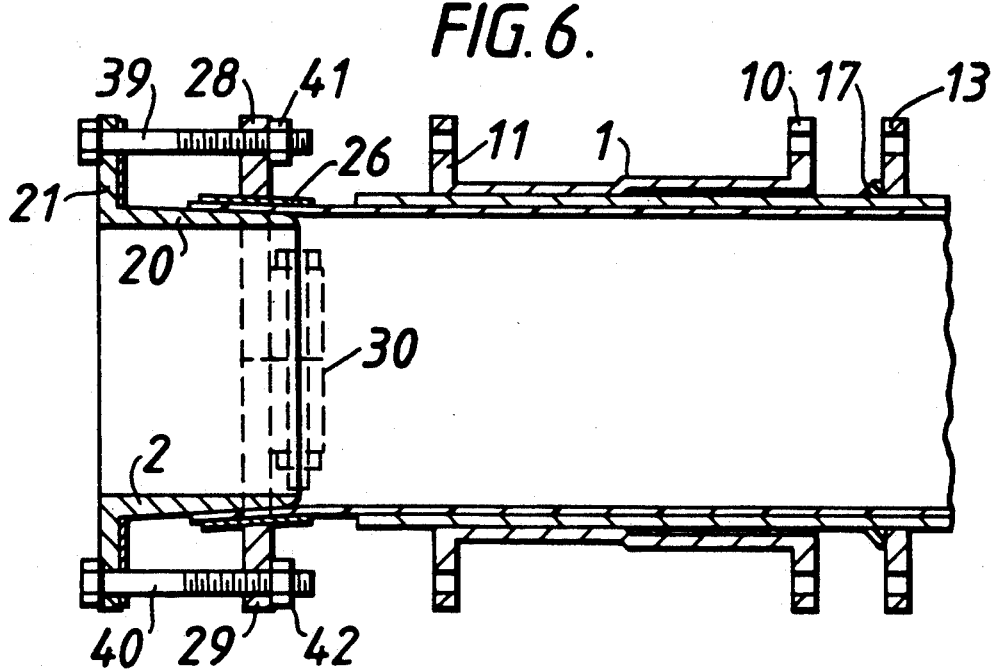

In order to ensure that the lining portion 8 is securely clamped between the body 20 of the member 2 and the clamping ring 26, the latter is drawn towards the flange 21 of the member 2 by means of a special drawing tool. This comprises two clamping pieces 28 and 29 which when locked together form an annulus for clamping around the ring 2 as shown in FIGS. 6 and 7. The pieces 28 and 29 are provided with two releasable locking assemblies 30 (only one shown) for locking the pieces together about the ring as shown in FIGS. 6 and 7. Each locking assembly 30 comprises internally threaded bushes 31 and 32, one located on each piece for engagement and alignment to receive a bolt 33 for locking the pieces together by means of a nut 34 after the bolt 33 has been threaded through the aligned bores of the bushes. The assembly 30 shown in the Figures lies adjacent an outer edge of the pieces 28 and 29 while a corresponding further assembly lies adjacent a diametrically opposite outer edge of the pieces. Each piece 28 and 29 is also provided with through-going apertures 35 and 36 respectively for alignment with corresponding apertures 37 and 38 in the flange 21 of the member 2 to receive drawing bolts 39 and 40 as shown in FIGS. 6 and 7. Nuts 41 and 42 are then located on the bolts 39 and 40 respectively and by tightening the nuts 41 and 42 against the pieces 28 and 29 the pieces 28 and 29 are drawn towards the flange 21 thereby drawing the clamping ring 26 towards the flange 21 and so compressing the lining portion 8 against the body 20 of the member 2. To equalize the forces on the pieces, there may be two or more drawing bolt/nut assemblies for each piece which are consequently provided with a corresponding number of apertures.

After the ring 26 has been drawn over the lining portion 8 in the manner described the pieces 28 and 29 are disassembled and removed so that the position shown at FIG. 8 is reached. The collar is then moved towards the flange 21 of the member 2 and is then connected thereto and a adjacent pipe or pipe section 16 in the manner shown in FIG. 2. Finally the sliding flange 13 and gasket 17 are moved back towards the flange 10 of the collar 1 and the flange 13 is connected to the flange 10 in the manner shown in FIG. 2.

Referring to FIG. 9 instead of the fitting serving to connect the pipe or pipe section 4 to a further pipe or pipe section as shown in FIGS. 1 and 2, the fitting may be used to blank off the end of the pipe or pipe section 4 as shown. Here a blanking disc 42 is connected by the nut and bolt assemblies 14 to the flange 21 of the member 2.

The fitting may be used to connect a first section of a pipe lined with a hose to an adjoining unlined section.

The fitting may also be used to connect a hose-lined pipe to a further pipe. As just described it may also be used to blank off the end of a hoselined pipe.

The fitting is suitable for pipes lined with the resin impregnated fabric type of hose, or with polyethylene or similar type plastics materials, such pipes normally being of pit cast, spun or ductile iron and steel, the lining serving to extend the life of an otherwise defunct pipe used for instance as a gas, water or sewage main or for carrying petrochemicals.

After the fittings shown in FIGS. 1 and 2 have been assembled the soundness of the seal between the lining 6 and its clamping member (member 2 in FIG. 1 and ring 26 in FIG. 2) may be tested independently of the rest of the lined pipe by for instance drilling a hole through the collar part 7 into the spaces 43 in FIG. 1 and 44 in FIG. 2 between the body 20 of the member 2 and the collar part 7. If the seal is sound no gas will be detected issuing through the hole.

I claim:

1. A fitting for connection to an end of a pipe lined internally with a compressible lining with which the fitting is to form a seal, the fitting comprising a collar having an internal wall adapted to fit over said end of said pipe and over a part of the lining protruding from said end of the pipe, means for connecting the collar to the pipe, a generally cylindrical member extendable into the interior of said collar so as to form an annular interface between an external wall of the member and the internal wall of said collar, with a portion of the lining therebetween, said member having an external wall adapted to force at least a circumferential portion of the lining towards a circumferential portion of the internal wall of the collar, means to connect said member to said collar and an airtight seal between the member and the collar which forms an airtight space within said interface whereby airtightness of connection between the lining and the member can be separately monitored.

2. A fitting according to claim 1, wherein said member has an external diameter which tapers inwardly from one end to the end which, in use, is to lie closer to the end of said pipe.

3. A fitting according to claim 1, wherein said collar has a part which has an internal diameter which tapers inwardly from one end, said lining, in use, being clamped to this said part.

4. A fitting according to claim 1, wherein said external wall of said member is provided with a multiplicity of indentations extending inwardly from an outer surface of the said wall.

5. A fitting according to claim 1 in combination with a said pipe, wherein said means for connecting said collar to said pipe is a compression fitting wherein a compressible gasket extends around said pipe and a first flange which is slidable on said pipe extends around said pipe for compressing said gasket between said first flange and a second flange mounted on said collar and attached to said first flange by securing means.

6. A fitting for connection to an end of a pipe lined internally with a compressible lining with which the fitting is to form a seal, the fitting comprising a collar having an internal wall adapted to fit over said end of said pipe and over a part of the lining protruding from said end of the pipe, means for connecting the collar to the pipe, a generally cylindrical member extendable into the interior of said collar so as to form an annular interface between an external wall of the member and the internal wall of said collar, means for clamping a circumferential portion of said lining to said external wall of said member, means to connect said member to said collar and an airtight seal between the member and the collar which forms an airtight space within said interface whereby airtightness of connection between the lining and the member can be separately monitored.

7. A fitting according to claim 6, wherein said member has an external diameter which tapers inwardly from one end to the end which, in use, is to lie closer to said end of said pipe.

8. A fitting according to claim 6, wherein said external wall of said member is provided with a multiplicity of indentations extending inwardly from the outer surface of said wall.

9. A fitting according to claim 6, wherein said clamping means comprising a ring for fitting around a circumferential portion of said lining and clamping said lining to said external wall of said member.

10. A fitting according to claim 9, wherein said ring is of resilient material.

11. A fitting according to claim 9, wherein said ring is of frusto-conical form and, in use, the smaller diameter end of said ring lies closer to said end of said pipe.

12. A fitting according to claim 6 in combination with a said pipe, wherein said means for connecting said collar to said pipe is a compression fitting wherein a compressible gasket extends around said pipe and a first flange which is slidable on said pipe extends around said pipe for compressing said gasket between said first flange and a second flange mounted on said collar and attached to said first flange by securing means, said gasket comprising said airtight seal.

13. In combination, a pipe end and a fitting for connecting an internal lining protruding from the pipe end to the pipe end itself with an air-tight seal, comprising:
a collar surrounding the pipe end and the protruding end of the lining,
a generally cylindrical member extending into the interior of the collar, inside of the protruding end of the lining, so as to form an annular interface between an external wall of the generally cylindrical member and an internal wall of the collar, the protruding end of the lining being located in said interface between the collar and said generally cylindrical member,
clamping means for air-tightly clamping the protruding end of the lining to the exterior wall of the generally cylindrical member, and
an airtight seal between the member and the collar which forms an airtight space within said interface whereby airtightness of connection between the lining and the member can be separately monitored.

14. The combination of claim 13, wherein said clamping means comprises a ring surround a circumferential portion of the lining and clamping the lining air-tightly to the external wall of the generally cylindrical member.

15. The combination of claim 13, wherein the clamping means comprises a portion of the external wall of the generally cylindrical member which tapers inwardly towards the end of the pipe, and the internal wall of the collar surround the generally cylindrical member, which has a corresponding taper, for air-tightly clamping the lining between the collar and the generally cylindrical member.

16. The combination of claim 13, said air-tight space being located axially, away from the pipe end, beyond the location where the clamping means air-tightly clamps the lining to the generally cylindrical member.

* * * * *